United States Patent
Tsuzaka et al.

(10) Patent No.: US 12,018,161 B2
(45) Date of Patent: Jun. 25, 2024

(54) WATER-BASED INK FOR INK-JET RECORDING AND INK SET

(71) Applicant: BROTHER KOGYO KABUSHIKI KAISHA, Nagoya (JP)

(72) Inventors: Yuka Tsuzaka, Nagoya (JP); Mitsunori Maeda, Nagoya (JP); Keisuke Yuhara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 333 days.

(21) Appl. No.: 16/925,452

(22) Filed: Jul. 10, 2020

(65) Prior Publication Data
US 2021/0009830 A1    Jan. 14, 2021

(30) Foreign Application Priority Data

Jul. 12, 2019 (JP) ................. 2019-130464

(51) Int. Cl.
*C09D 11/322* (2014.01)
*C09D 11/033* (2014.01)
*C09D 11/037* (2014.01)
*C09D 11/40* (2014.01)

(52) U.S. Cl.
CPC .......... *C09D 11/322* (2013.01); *C09D 11/033* (2013.01); *C09D 11/037* (2013.01); *C09D 11/40* (2013.01)

(58) Field of Classification Search
CPC ... C09D 11/322; C09D 11/033; C09D 11/037; C09D 11/40; C09B 67/0033; C09B 67/009
See application file for complete search history.

(56) References Cited

U.S. PATENT DOCUMENTS 6,312,512 B1    11/2001    Urban et al.
6,482,256 B1 *  11/2002    Kanaya ................. C09D 11/40
                                             106/31.47

(Continued)

FOREIGN PATENT DOCUMENTS

CN    101659807 A    3/2010
CN    101671503 A    3/2010

(Continued)

OTHER PUBLICATIONS

English machine translation of JP2009197093A ("Machine_Translation_Mizutani_JP_2009197093_A") (Year: 2009).*

(Continued)

*Primary Examiner* — Jennifer A Smith
*Assistant Examiner* — Jeffrey Eugene Barzach
(74) *Attorney, Agent, or Firm* — Merchant & Gould P.C.

(57) ABSTRACT

A water-based ink for ink-jet recording includes: water; a solid solution pigment composed of at least a first pigment and a second pigment; and a non-solid solution pigment which is the same as the first pigment. An image $L^*_{60}$ of the first pigment has the highest chromaticness $C^*$ among those of pigments composing the solid solution pigment, the image $L^*_{60}$ having lightness $L^*$ which is closest to 60 among a plurality of solid images recorded on a recording paper by using one of aqueous dispersions containing the pigments composing the solid solution pigment at a same solid content concentration, respectively, while changing recording duty at every 5% in a range of 0% to 100%.

3 Claims, 2 Drawing Sheets

(56) References Cited

U.S. PATENT DOCUMENTS

| | | | |
|---|---|---|---|
| 2005/0011403 A1 | 1/2005 | Mitina et al. | |
| 2005/0106481 A1 | 5/2005 | Ayaki et al. | |
| 2007/0242118 A1* | 10/2007 | Koganehira | C09D 11/326 |
| | | | 106/31.89 |
| 2008/0241398 A1 | 10/2008 | Kato et al. | |
| 2010/0043670 A1* | 2/2010 | Shiono | C09D 11/40 |
| | | | 106/31.6 |
| 2010/0062161 A1 | 3/2010 | Shiono et al. | |
| 2010/0212543 A1 | 8/2010 | Shiono et al. | |
| 2011/0132228 A1 | 6/2011 | Shiono et al. | |
| 2011/0277662 A1* | 11/2011 | Shiono | C09D 11/40 |
| | | | 106/31.77 |
| 2012/0266779 A1 | 10/2012 | Morinaga et al. | |
| 2013/0050355 A1 | 2/2013 | Imamura et al. | |
| 2013/0050364 A1* | 2/2013 | Imamura | C09D 11/40 |
| | | | 347/100 |
| 2013/0220180 A1 | 8/2013 | Maekawa et al. | |
| 2013/0274462 A1 | 10/2013 | Maekawa et al. | |
| 2014/0005417 A1 | 1/2014 | Takahashi et al. | |
| 2016/0002478 A1 | 1/2016 | Jackson et al. | |
| 2016/0215153 A1 | 7/2016 | Okazaki et al. | |
| 2016/0289474 A1* | 10/2016 | Tsuzaka | G01N 21/59 |
| 2017/0022383 A1 | 1/2017 | Prasad et al. | |
| 2017/0183523 A1 | 6/2017 | Deardurff et al. | |
| 2017/0267890 A1* | 9/2017 | Tsuzaka | C09D 11/326 |
| 2017/0283630 A1* | 10/2017 | Nishiura | C09D 11/328 |
| 2017/0369723 A1* | 12/2017 | Mizutaki | B41J 2/04 |
| 2018/0258302 A1 | 9/2018 | Masada et al. | |
| 2018/0284631 A1 | 10/2018 | Kayamori et al. | |
| 2019/0161634 A1 | 5/2019 | Kinjoh et al. | |
| 2019/0256727 A1 | 8/2019 | Kumai et al. | |
| 2021/0130639 A1* | 5/2021 | Sugihara | B41M 5/0017 |
| 2021/0238431 A1 | 8/2021 | Yoda et al. | |

FOREIGN PATENT DOCUMENTS

| | | | | |
|---|---|---|---|---|
| CN | 102086321 A | 6/2011 | | |
| CN | 102746732 A | 10/2012 | | |
| CN | 105820661 A | 8/2016 | | |
| CN | 105899625 A | 8/2016 | | |
| CN | 108693724 A | 10/2018 | | |
| CN | 109415583 A | 3/2019 | | |
| EP | 1 967 558 A1 | 9/2008 | | |
| JP | 2000-281930 A | 10/2000 | | |
| JP | 2002-156795 A | 5/2002 | | |
| JP | 2005-48017 A | 2/2005 | | |
| JP | 3870050 B2 | 1/2007 | | |
| JP | 2008-246821 A | 10/2008 | | |
| JP | 2009-197093 A | 9/2009 | | |
| JP | 2009197093 A * | 9/2009 | | |
| JP | 2012-72368 A | 4/2012 | | |
| JP | 2012-126893 A | 7/2012 | | |
| JP | 2013-203846 A | 10/2013 | | |
| JP | 2013209668 A * | 10/2013 | | C09D 11/40 |
| JP | 2014-31443 A | 2/2014 | | |
| JP | 2017-218541 A | 12/2017 | | |
| JP | 2018-150515 A | 9/2018 | | |
| JP | 2019038874 A * | 3/2019 | | |
| JP | 2019-98668 A | 6/2019 | | |
| JP | 2019-210452 A | 12/2019 | | |
| JP | 2019-214717 A | 12/2019 | | |
| JP | 2020-23604 A | 2/2020 | | |
| WO | 2015/105503 A1 | 9/2015 | | |
| WO | 2015/187143 A1 | 12/2015 | | |
| WO | 2019/235628 A1 | 12/2019 | | |

OTHER PUBLICATIONS

English machine translation of JP2019038874A ("Machine_Translation_Sekiguchi_JP_2019038874_A") (Year: 2019).*
English machine translation of JP2013209668A ("Machine_Translation_Sato_JP_2013209668_A") (Year: 2013).*
International Search Report issued in corresponding International Patent Application No. PCT/JP2020/026159, Oct. 21, 2020.
Written Opinion issued in corresponding International Patent Application No. PCT/JP2020/026159, Oct. 21, 2020.
Office Action issued in corresponding Chinese Patent Application No. 202080047006.8, Oct. 10, 2022.
Notice of Reasons of Refusal in Japanese Patent Application 2019-130464 on May 16, 2023.
Non-Final Rejection issued in related U.S. Appl. No. 16/925,362 on Aug. 31, 2022.
Final Rejection issued in related U.S. Appl. No. 16/925,362 on Feb. 15, 2023.
Non-Final Rejection issued in related U.S. Appl. No. 17/244,331 on Oct. 26, 2022.
Final Rejection issued in related U.S. Appl. No. 17/244,331 on Apr. 7, 2023.
Non-Final Rejection issued in related U.S. Appl. No. 16/925,511 on Oct. 13, 2022.
Final Rejection issued in related U.S. Appl. No. 16/925,511 on Mar. 3, 2023.
Non-Final Rejection issued in related U.S. Appl. No. 16/925,484 on Oct. 24, 2022.
Non-Final Rejection issued in related U.S. Appl. No. 16/925,484 on Apr. 6, 2023.
Non-Final Rejection issued in related U.S. Appl. No. 16/925,367 on Sep. 29, 2022.
Final Rejection issued in related U.S. Appl. No. 16/925,367 on Mar. 3, 2023.
Non-Final Rejection issued in related U.S. Appl. No. 16/925,459 on Oct. 12, 2022.
Non-Final Rejection issued in related U.S. Appl. No. 16/925,459 on Mar. 15, 2023.
English Machine Translation of JP3870040B2 ("Machine_Translation_Tosaka_JP_3870050_B2") (Year: 2007).
Office Action (Notice of Reasons for Refusal) issued in related Japanese Patent Application No. 2019-130460, May 9, 2023.
Office Action (Notice of Reasons for Refusal) issued in related Japanese Patent Application No. 2019-130461, May 9, 2023.
Office Action (Notice of Reasons for Refusal) issued in related Japanese Patent Application No. 2019-130462, May 9, 2023.
Office Action (Notice of Reasons for Refusal) issued in related Japanese Patent Application No. 2019-130463, May 9, 2023.
Office Action (Notice of Reasons for Refusal) issued in related Japanese Patent Application No. 2019-130465, May 9, 2023.
Second Office Action issued in corresponding Chinese Patent Application No. 202080047006.8, May 13, 2023.
Office Action issued in related U.S. Appl. No. 16/925,484, filed Aug. 28, 2023.
Office Action issued in related U.S. Appl. No. 16/925,459, filed Aug. 28, 2023.
Office Action issued in related Japanese Patent Application No. 2019-130461, Aug. 15, 2023.
Second Office Action issued in related Chinese Patent Application No. 202180029213.5, Sep. 6, 2023.
Office Action issued in related Chinese Patent Application No. 202080046967.7, Sep. 2, 2022.
Office Action (Decision of Refusal) issued in related Chinese Patent Application No. 202080046967.7, Mar. 25, 2023.
Office Action issued in related Chinese Patent Application No. 202080046968.1, Jul. 4, 2022.
Office Action (Decision of Refusal) issued in related Chinese Patent Application No. 202080046968.1, Mar. 28, 2023.
Office Action issued in related Chinese Patent Application No. 202080046969.6, Jul. 5, 2022.
Office Action issued in related Chinese Patent Application No. 202080046969.6, Jan. 4, 2023.
Office Action (Decision of Refusal) issued in related Chinese Patent Application No. 202080046969.6, May 30, 2023.
Office Action issued in related Chinese Patent Application No. 202180029213.5, Feb. 14, 2023.
Office Action issued in related U.S. Appl. No. 17/244,331, filed Sep. 22, 2023.

(56) References Cited

OTHER PUBLICATIONS

Final Office Action issued in the related U.S. Appl. No. 17/244,331, filed Mar. 15, 2024.

\* cited by examiner

WATER-BASED INK FOR INK-JET RECORDING AND INK SET

CROSS REFERENCE TO RERATED APPLICATION

The present application claims priority from Japanese Patent Application No. 2019-130464 filed on Jul. 12, 2019, the disclosure of which is incorporated herein by reference in its entirety.

BACKGROUND OF THE INVENTION

Field of the Invention

The present invention relates to a water-based ink for ink-jet recording and an ink set.

Description of the Related Art

Conventionally, as water-based inks for ink-jet recording, there are known inks including pigments of three primary colors which are yellow, cyan and magenta, respectively. Further, in order to improve the coloring (color development) of each of these inks, it is known to use, in a water-based ink for ink-jet recording, a solid solution pigment containing two or more kinds of pigments to thereby improve the characteristic of the ink (see Patent Literature 1: Japanese Patent Application Laid-open No. 2018-150515 corresponding to United States Patent Application Publication No. US2018/0258302).

In the recent years, there is an ever increasing demand for an improved chromaticness of a magenta ink of which impact on the visibility is particularly high among the three primary colors. On the other hand, in a conventional magenta ink, it is difficult to improve both the chromaticness of magenta in a case, for example that the lightness (brightness) $L^*$ is high, such as approximately 60, and the chromaticness of a secondary color (for example, blue obtained by mixing magenta and cyan).

In view of the above situation, an object of the present teaching is to provide a water-based ink for ink-jet recording in which the chromaticness of magenta and the chromaticness of the secondary color are both high.

SUMMARY OF THE INVENTION

According to a first aspect of the present teaching, there is provided a water-based ink for ink-jet recording including:
water;
a solid solution pigment composed of at least a first pigment and a second pigment; and
a non-solid solution pigment which is the same as the first pigment,
wherein an image $L^*_{60}$ of the first pigment has the highest chromaticness $C^*$ among those of pigments composing the solid solution pigment, the image $L^*_{60}$ having lightness $L^*$ which is closest to 60 among a plurality of solid images recorded on a recording paper by using one of aqueous dispersions containing the pigments composing the solid solution pigment at a same solid content concentration, respectively, while changing recording duty at every 5% in a range of 0% to 100%.

According to a second aspect of the present teaching, there is provided an ink set including:
a water-based magenta ink for ink-jet recording which is the water-based ink for ink-jet recording of the first aspect; and
a water-based cyan ink for ink-jet recording including a cyan pigment and water.

BRIEF DESCRIPTION OF THE DRAWINGS

FIG. 1A and FIG. 1B are each a graph explaining the synergistic effect of the present teaching, wherein FIG. 1A is a view indicating colors (chromaticities) of images recorded by using water-based inks of Reference Examples 1 and 3, Example 2, Comparative Example 3, and by using a water-based ink containing a solid solution pigment of PR122 and PV19, respectively, in the $L^*a^*b^*$ color system chromaticity diagram ($a^*$-$b^*$ plane) indicating $a^*$ and $b^*$ on a plane; and FIG. 1B is a view indicating colors (chromaticities) of images recorded by using the water-based inks, respectively, in the $L^*a^*b$ color system chromaticity diagram ($a^*$-$L^*$ plane) indicating $a^*$ and $L^*$ on a plane.

DESCRIPTION OF THE PREFERRED EMBODIMENT

Figure 1A:
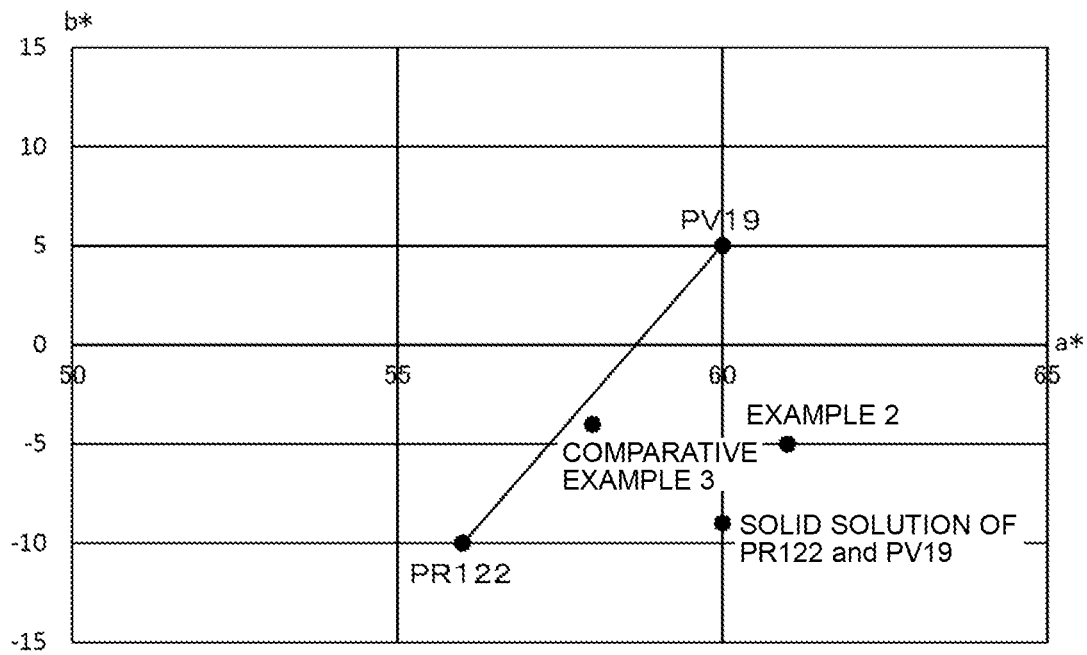

A water-based ink for ink-jet recording (hereinafter also referred to as a "water-based ink" or an "ink", in some cases) related to the present teaching will be explained. The water-based ink related to the present teaching includes a solid solution pigment, a non-solid solution pigment and water.

The solid solution pigment contains two or more kinds of pigments. Namely, the solid solution pigment is composed of at least a first pigment and a second pigment. In the present teaching, the term "solid solution pigment" means a pigment which is present as a mixed crystal of two or more kinds of pigment molecules (in a mixed crystallized state), and is different from being simply a mixture of the two or more kinds of pigments. The solid solution pigment contains at least two kinds of pigments. Namely, it is allowable that the solid solution pigment contains only two kinds of pigments (only the first pigment and the second pigment) or contains three or more kinds of pigments.

The non-solid solution pigment is of a same kind as that of a certain pigment (the first pigment) which is included in the two or more kinds of the pigments constructing the solid solution pigment, chromaticness $C^*$ of a solid image, which is recorded by using the certain pigment and of which lightness $L^*$ is closest to 60, being highest among the two or more kinds of pigments, the solid image being included in a plurality of solid images recorded on a recording paper by using each of aqueous dispersions obtained by adjusting one of the two or more kinds of pigments, including the certain pigment, to have a same solid content concentration (for example, 7% by mass), while changing recording duty at every 5% in a range of 0% to 100%. The non-solid solution pigment means a pigment which does not construct a solid solution with another pigment, and which is dispersed in a solvent of the water-based ink.

Namely, the non-solid solution pigment is the same as the first pigment which is explained below. An image $L^*60$ of the first pigment has the highest chromaticness $C^*$ among those of pigments composing the solid solution pigment. The image $L^*60$ is determined by: preparing aqueous dispersions containing the pigments composing the solid solution pigment, respectively, at a same solid content concentration; recording a plurality of solid images on a recording paper by using one of the aqueous dispersions, while changing recording duty at every 5% in a range of 0% to 100%; and selecting the image L*60 of which lightness L* is closest to 60 among the plurality of solid images.

The pigment usable for the solid solution pigment and the non-solid solution pigment is exemplified, for example, by: C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 177, 178, 184, 185, 190, 202, 221, 222, 224 and 238; C. I. Pigment Violets 19 and 196; etc. Among the above-described pigments, a quinacridone pigment is preferred. The first pigment may be C.I. Pigment Violet 19. The second pigment may be C.I. Pigment Red 122 or C.I. Pigment Red 202. Note that it is allowable to use, as the solid solution pigment, a commercially available product; or it is allowable to produce the solid solution pigment by a publicly known producing method.

The recording paper is not particularly limited; it is allowable to use, for example, generally used paper (paper sheet) exemplified, for example, by regular paper (plain paper) such as "Hammermill Fore (trade name) Multi-Purpose Paper" produced by INTERNATIONAL PAPER COMPANY, etc.

In the present teaching, the "recording duty" is defined, for example, by the following formula.

Recording duty (%)=Number of actually recorded dots/(vertical resolution×horizontal resolution)×100

Number of actually recorded dots: number of actually recorded dots per unit area Vertical resolution: vertical resolution per unit area Horizontal resolution: horizontal resolution per unit area The above-described lightness (L*) is, for example, based on the L*a*b* color system (CIE 1976 (L*a*b*)) color system) normalized or standardized by Commission Internationale d'Eclairage (CIE) in 1976 (see, JIS Z 8729).

The above-described chromaticness (C*) is calculated, for example, based on a* and b* which are based on the L*a*b* color system (CIE 1976 (L*a*b*) color system) normalized or standardized by Commission Internationale d'Eclairage (CIE) in 1976 (see, JIS Z 8729).

$$C^* = \{(a^{*2}) + (b^{*2})\}^{1/2}$$

Next, an explanation will be given about a relationship between the solid solution pigment and the non-solid solution pigment, with an example wherein the solid solution pigment is a quinacridone pigment containing two kinds of pigments which are C.I. Pigment Red 122 (hereinafter referred to as "PR122" in some cases) and C.I. Pigment Violet 19 (hereinafter referred to as "PV19" in some cases).

As indicated in Reference Examples 1 and 3 (to be described later on), the chromaticness C* of an Image $L^*_{60}$ which is recorded by using a 7% by mass aqueous dispersion of PV19 is higher than the chromaticness C* of an Image $L^*_{60}$ which is recorded by using a 7% by mass aqueous dispersion of PR122. Accordingly, in this case, the non-solid solution pigment is PV19.

The water-based ink uses the solid solution pigment in combination with the non-solid solution pigment; and the non-solid solution pigment is made to be of the same kind as that of the certain pigment which is included in the two kinds of pigments constructing the solid solution pigment, the certain pigment having the chromaticness C*, in a case that the lightness L* is high which is approximately 60, which is the highest among the two kinds of pigments constructing the solid solution pigment. Accordingly, in the water-based ink, the chromaticness of magenta and the chromaticness of the secondary color are both high. The above-described effect exceeds an arithmetic mean intermediate level of the two kinds of pigments.

Figure 1B:
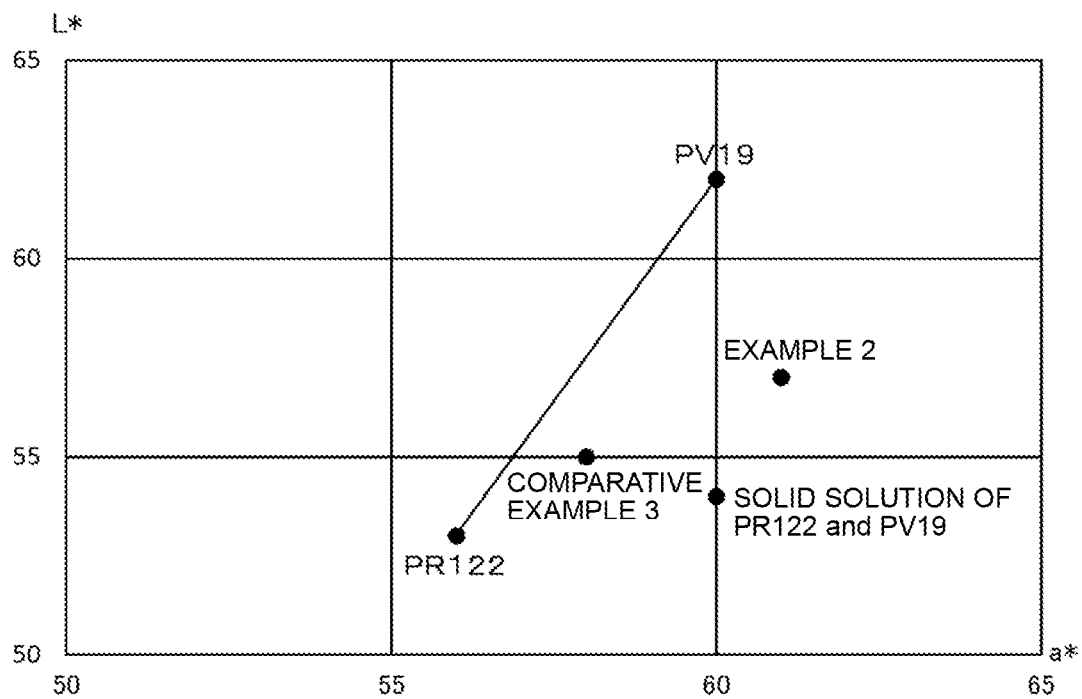

For example, FIGS. 1A and 1B depict a plot of the color (chromaticity) of an image formed by using a water-based ink using only PR122 as the pigment (Reference Example 1 to be described later on), a plot of the color (chromaticity) of an image formed by using a water-based ink using only PV19 as the pigment (Reference Example 3 to be described later on), and straight line PR122-PV19 connecting these two plots. The arithmetic mean intermediate level of PR122 and PV19 is on the straight line PR122-PV19. A plot (Comparative Example 3) of the color (chromaticity) of an image formed by using a water-based ink of Comparative Examples 3 which did not use the solid solution pigment but used two kinds of non-solid solution pigments is located at a position close to the straight line PR122-PV19. Namely, the color (chromaticity) of the image recorded by the water-based ink of Comparative Example 3 which uses a mixture of PR122 and PV19 has the arithmetic mean intermediate level of PR122 and PV19.

On the other hand, a plot (solid solution of PR122 and PV19) of the color (chromaticity) of an image recorded by a water-based ink which used the solid solution of PV122 and PV19 as the pigment exceeded the straight line PR122-PV19, and a plot (Example 2 to be described later on) of the color (chromaticity) of an image recorded by a water-based ink which used the solid solution in combination with PV19 further exceeded the straight line, thus exhibiting the synergistic effect.

In the a*-b* plane as depicted in FIG. 1A, the phrase such as "exceed the straight line PR122-PV19" means that the straight line PR122-PV19 is located between the plot of the water-based ink and the origin in the a*-b* plane shown in FIG. 1A. Namely, the chromaticness of the water-based ink (Example 2) of the present teaching is higher than the chromaticness of the water-based ink plotted on the straight line PR122-PV19 having the same hue angle as the water-based ink of the present teaching. Further, in the a*-L* plane as depicted in FIG. 1B, the phrase such as "exceed the straight line PR122-PV19" means being plotted on the right side with respect to the straight line PR122-PV19, namely that the absolute value of the a* of the water-based ink is greater than that in the plot on the straight line PR122-PV19 which has the same Lightness L*. Generally, as the lightness L* increases, the chromaticity tends to decrease. However, as indicated in FIG. 1B, the water-based ink (Example 2) of the present teaching has chromaticity (absolute value of the a*) which is higher than chromaticity of the water-based ink plotted on the straight line PR122-PV19 even in a case that the lightness (brightness) L* is high (for example, L* is not less than 50 or approximately 60).

It is presumed that the water-based ink of the present teaching achieves the above-described synergistic effect due to the following reasons. Using two or more kinds of pigments as one solid solution pigment inhibits color interference among the two or more kinds of pigments, and using the solid solution pigment along with non-solid solution pigment having similar structure with the solid solution pigment inhibits color interference between the non-solid solution pigment and the solid solution pigment. As a result, it is possible to obtain the water-based ink which is excellent in the chromaticness. This mechanism, however, is merely a presumption, and the present teaching is not limited to or restricted by this presumed mechanism. Note that the water-based inks of Reference Examples 1 and 3, Example 2 and Comparative Example 3, and the water-based ink using the solid solution of PR122 and PV19 as the pigment have a similar composition except that the kinds of pigment contained therein are different. The content amount of the pigment in each of the water-based inks is 7.0% by mass.

A content amount (S) of the solid solution pigment in the entire amount of the water-based ink is, for example, in a range of 1% by mass to 10% by mass, in a range of 2% by mass to 8% by mass, or in a range of 3% by mass to 6% by mass.

A content amount (P) of the non-solid solution pigment in the entire amount of the water-based ink is, for example, in a range of 0.5% by mass to 10% by mass, in a range of 1% by mass to 6% by mass, or in a range of 1.5% by mass to 4.5% by mass.

The mass ratio (S:P) of the content amount (S) of the solid solution pigment to the content amount (P) of the non-solid solution pigment in the entire amount of the water-based ink is, for example, in a range of S:P=8:2 to 3:7, or in a range of S:P=7:3 to 5:5. In a case that the mass ratio (S:P) is made to be in the range of S:P=7:3 to 5:5, it is possible to obtain a water-based ink which is further excellent in the balance of the chromaticness of magenta and the chromaticness of the secondary color.

The total (sum) (S+P) of the content amount (S) of the solid solution pigment to the content amount (P) of the non-solid solution pigment in the entire amount of the water-based ink is, for example, in a range of S+P=6% by mass to 9% by mass, or in a range of S+P=6.5% by mass to 8.5% by mass. In a case that the total (S+P) is made to be in the range of S+P=6.5% by mass to 8.5% by mass, it is possible to obtain a water-based ink which is further excellent in the balance of the chromaticness of magenta and the chromaticness of the secondary color.

In the water-based ink, for example, the mean particle diameter of the solid solution pigment is greater than the mean particle diameter of the non-solid solution pigment. By using the non-solid solution pigment having the mean particle diameter which is smaller than that of the solid solution pigment, it is possible to obtain a water-based ink which is further excellent in the chromaticness in a case that the lightness (brightness) $L^*$ is high.

The mean particle diameter can be measured as the arithmetic mean diameter. The mean particle diameter can be measured, for example, by diluting the pigment so that a solid content amount thereof is 0.02% by mass, and by using a dynamic light scattering particle diameter distribution measuring apparatus "LB-550" (product name) produced by HORIBA LTD., with the intensity of the scattered light as the reference for the particle diameter. Namely, the mean particle diameter may be a mean particle diameter (intensity mean particle diameter) calculated from the particle diameter distribution based on the intensity (light scattering intensity). The mean particle diameter of the solid solution pigment is, for example, in a range of 1.01 times to 2 times, in a range of 1.01 times to 1.5 times, in a range of 1.01 times to 1.2 times, or 1.03 times the mean particle diameter of the non-solid solution pigment. The difference between the mean particle diameter of the solid solution pigment and the mean particle diameter of the non-solid solution pigment is, for example, in a range of 0.5 nm to 50 nm, in a range of 1 nm to 25 nm, in a range of 1 nm to 20 nm, or 4 nm. The mean particle diameter of the solid solution pigment is, for example, in a range of 50 nm to 200 nm, in a range of 80 nm to 150 nm, in a range of 100 nm to 140 nm, or 128 nm. The mean particle diameter of the non-solid solution pigment is, for example, in a range of 50 nm to 200 nm, in a range of 80 nm to 150 nm, in a range of 100 nm to 140 nm, or 124 nm.

It is allowable that the water-based ink further contains a pigment and/or a dye, etc., which are different from the solid solution pigment and the non-solid solution pigment, in addition to the solid solution pigment and the non-solid solution pigment, or that the water-based ink does not further contain a pigment and/or a dye, etc., which are different from the solid solution pigment and the non-solid solution pigment.

The pigment usable for the water-based ink is exemplified, including pigments usable as the solid solution pigment and the non-solid solution pigment, by: C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224 and 238; C. I. Pigment Violets 19 and 196; etc. Among the above-described pigments, the quinacridone pigment and the azo pigments are preferred.

The water-based ink may be a water-based ink in which the pigment is dispersed in water by a dispersant. As the dispersant, it is allowable to use, for example, a general polymeric dispersant (resin for dispersing pigment, or pigment-dispersing resin), etc. The pigment may be a self-dispersible pigment. The self-dispersible pigment is dispersible in water without using any dispersing agent, for example, owing to the fact that at least one of the hydrophilic group and the salt thereof including, for example, a carbonyl group, a hydroxyl group, a carboxylic acid group, a sulfonic acid group, and a phosphate group is introduced into the surfaces of the pigment particles by the chemical bond directly or with any group intervening therebetween.

The water is preferably ion-exchanged water or pure water (purified water). The content amount of the water in the entire amount of the water-based ink may be, for example, in a range of 10% by mass to 90% by mass or in a range of 20% by mass to 80% by mass. The content amount of the water in the entire amount of the water-based ink may be, for example, a balance of the other components.

The water-based ink may further contain an acetylene glycol-based surfactant. The acetylene glycol-based surfactant is exemplified, for example, by a compound represented by the following formula (1), etc.

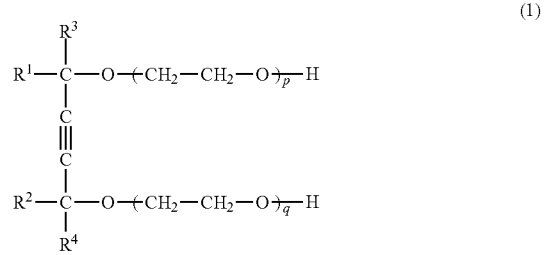

(1)

In the formula (1), p and q may be identical to each other or different from each other; for example, p+q is a number satisfying p+q=1 to 15, 3 to 11, or 4 to 10. In the formula (1), $R^1$, $R^2$, $R^3$ and $R^4$ may be identical with one another or different from one another, and each are a straight-chain or branched-chain alkyl group having 1 to 5 carbon atom(s).

It is allowable to use, for example, any commercially available product as the acetylene glycol-based surfactant. The commercially available product is exemplified, for example, by: "SURFYNOL (trade name) 440", "SURFYNOL (trade name) 465", and "SURFYNOL (trade name) 485" which are produced by AIR PRODUCTS AND CHEMICALS, Inc.; "OLFIN (trade name) E1004", "OLFIN (trade name) E1008" and "OLFIN (trade name) E1010" which are produced by NISSHIN CHEMICAL CO., LTD.; "ACETYLENOL (trade name) E40" and "ACETYLENOL (trade name) E100" produced by KAWAKEN FINE CHEMICALS CO., LTD.; and the like.

The content ratio of the acetylene-glycol based surfactant is, for example, not less than 5 parts by mass, in a range of 5 parts by mass to 10.0 parts by mass, or in a range of 5 parts by mass to 6.7 parts by mass, with respect to the total, of the content amount of the solid solution pigment and the content amount of the non-solid solution pigment, which is 100 parts by mass. In a case that the content ratio of the acetylene-glycol based surfactant is in the above-described range, the chromaticness of the water-based ink is further improved. In a case that the content ratio of the acetylene-glycol based surfactant is not less than 5 parts by mass, it is possible to obtain a water-based ink which is further excellent in the chromaticness of the secondary color.

It is preferable that the water-based ink further contains another surfactant which is different from the acetylene glycol-based surfactant. From the viewpoint of the solubility of the acetylene glycol-based surfactant, it is preferred that the acetylene glycol-based surfactant is used in combination with the another surfactant. The another surfactant is exemplified, for example, by: nonionic surfactants of "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series, etc., produced by KAO CORPORATION; nonionic surfactants of "SORBON (trade name)" series produced by TOHO CHEMICAL INDUSTRY CO., LTD.; nonionic surfactants of "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc., produced by LION CORPORATION; anionic surfactants of "EMAL (trade name)" series, "LATEMUL (trade name)" series, "VENOL (trade name)" series. "NEOPELEX (trade name)" series, NS SOAP, KS SOAP, OS SOAP, and "PELEX (trade name)" series, etc., produced by KAO CORPORATION; anionic surfactants of "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, and "LOTAT (trade name)" series, etc., produced by LION CORPORATION; cationic surfactants "KACHIOGEN (trade name) ES-OW" and "KACHIOGEN (trade name) ES-L" produced by DAI-ICHI KOGYO SEIYAKU CO., LTD., etc. It is allowable that only one kind of the another surfactant as described above is used singly, or two or more kinds of the another surfactant are used in combination.

The water-based ink may further contain a water-soluble organic solvent. The water-soluble organic solvent is exemplified, for example, by a humectant which prevents the ink from drying at an end of a nozzle in an ink-jet head, a penetrant which adjusts the drying velocity on a recording medium, etc.

The humectant is not particularly limited, and is exemplified, for example, by: lower alcohols such as methyl alcohol, ethyl alcohol, n-propyl alcohol, isopropyl alcohol, n-butyl alcohol, sec-butyl alcohol, and ten-butyl alcohol; amides such as dimethylformamide and dimethylacetamide; ketones such as acetone; ketoalcohols (ketone alcohols) such as diacetone alcohol; ethers such as tetrahydroftiran and dioxane; polyethers such as polyalkylene glycol; polyvalent alcohols such as alkylene glycol, glycerol, trimethylolpropane, trimethylolethane; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, it is preferable to use polyvalent alcohols such as alkylene glycol, glycerol, etc.

The content amount of the humectant in the entire amount of the water-based ink is, for example, in a range of 0% by mass to 95% by mass, in a range of 5% by mass to 80% by mass, or in a range of 5% by mass to 50% by mass.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the water-based ink is, for example, in a range of 0% by mass to 20% by mass, in a range of 0% by mass to 15% by mass, or in a range of 1% by mass to 6% by mass.

The water-based ink may further contain a conventionally known additive, as necessary. The additive includes, for example, pH-adjusting agents, viscosity-adjusting agents, surface tension-adjusting agents, fungicides, fixing agents for glossy paper, etc. The viscosity-adjusting agents include, for example, polyvinyl alcohol, cellulose, water-soluble resin, etc.

The water-based ink can be prepared, for example, such that the solid solution pigment, the non-solid solution pigment, the water, and optionally other additive component(s) as necessary are mixed uniformly or homogeneously by any conventionally known method, and undissolved matters are removed by a filter or the like.

As described above, the water-based ink for ink-jet recording related to the present teaching uses the solid solution pigment which contains the two or more kinds of pigments in combination with the non-solid solution pigment; and the non-solid solution pigment is of the same kind as that of the certain pigment which is included in the two or more kinds of pigments constructing or composing the solid solution pigment, the certain pigment having chromaticness $C^*$ which is highest among the two or more kinds of pigments in a case that the lightness (brightness) $L^*$ is high, such as approximately 60. Accordingly, in the water-based ink for ink-jet recording related to the present teaching, the chromaticness of magenta and the chromaticness of the secondary color are both high.

Next, an ink set related to the present teaching will be explained.

The ink set related to the present teaching includes a water-based magenta ink for ink-jet recording; and a water-based cyan ink for ink-jet recording, wherein the water-based magenta ink is the water-based ink for ink-jet recording related to the present teaching; and the water-based cyan ink includes a cyan pigment and water.

The cyan pigment is exemplified, for example, by: C. I. Pigment Blues 1, 2, 3, 15, 15:1, 15:2, 15:3, 15:4, 16, 22 and 60; a solid solution of any one of these pigments; and the like. Among those as described above, C.I. Pigment Blue 15:3 is preferred. It is allowable that only one kind of the cyan pigment as described above is used singly, or two or more kinds of the cyan pigment are used in combination.

In the water-based cyan ink, the water is preferably ion-exchanged water or pure water (purified water). The content amount of the water in the entire amount of the water-based cyan ink may be, for example, in a range of 10% by mass to 90% by mass, or in a range of 20% by mass to 80% by mass. The content amount of the water may be, for example, the balance of the other components.

The water-based cyan ink may contain, as necessary, a surfactant, a water-soluble organic solvent, an additive, etc., which are similar to those in the water-based ink which is related to the present teaching and which contains the solid solution pigment and the non-solid solution pigment.

The water-based cyan ink can be prepared, for example, such that the cyan pigment, the water, and optionally other additive component(s) as necessary are mixed uniformly or homogeneously by any conventionally known method, and undissolved matters are removed by a filter or the like.

The ink set related to the present teaching may further satisfy the following conditional expression. In a case that the following conditional expression is satisfied, it is possible to obtain an ink set which is further excellent in the chromaticness of secondary color (chromaticness of blue).

$$C<S+P$$

wherein in the conditional expression,

C: a content amount (% by mass) of the cyan pigment in the entire amount the water-based cyan ink; and SP: a total (% by mass) of a content amount (S) of the solid solution pigment and a content amount (P) of the non-solid solution pigment in an entire amount of the water-based magenta ink.

Next, an ink-jet recording apparatus related to the present teaching will be explained.

The ink-jet recording apparatus related to the present teaching is characterized by including: an ink storing section and an ink discharging mechanism, wherein an ink stored in the ink storing section is discharged by the ink discharging mechanism, and wherein the water-based ink for ink-jet recording related to the present teaching is stored in the ink storing section.

Figure 2:
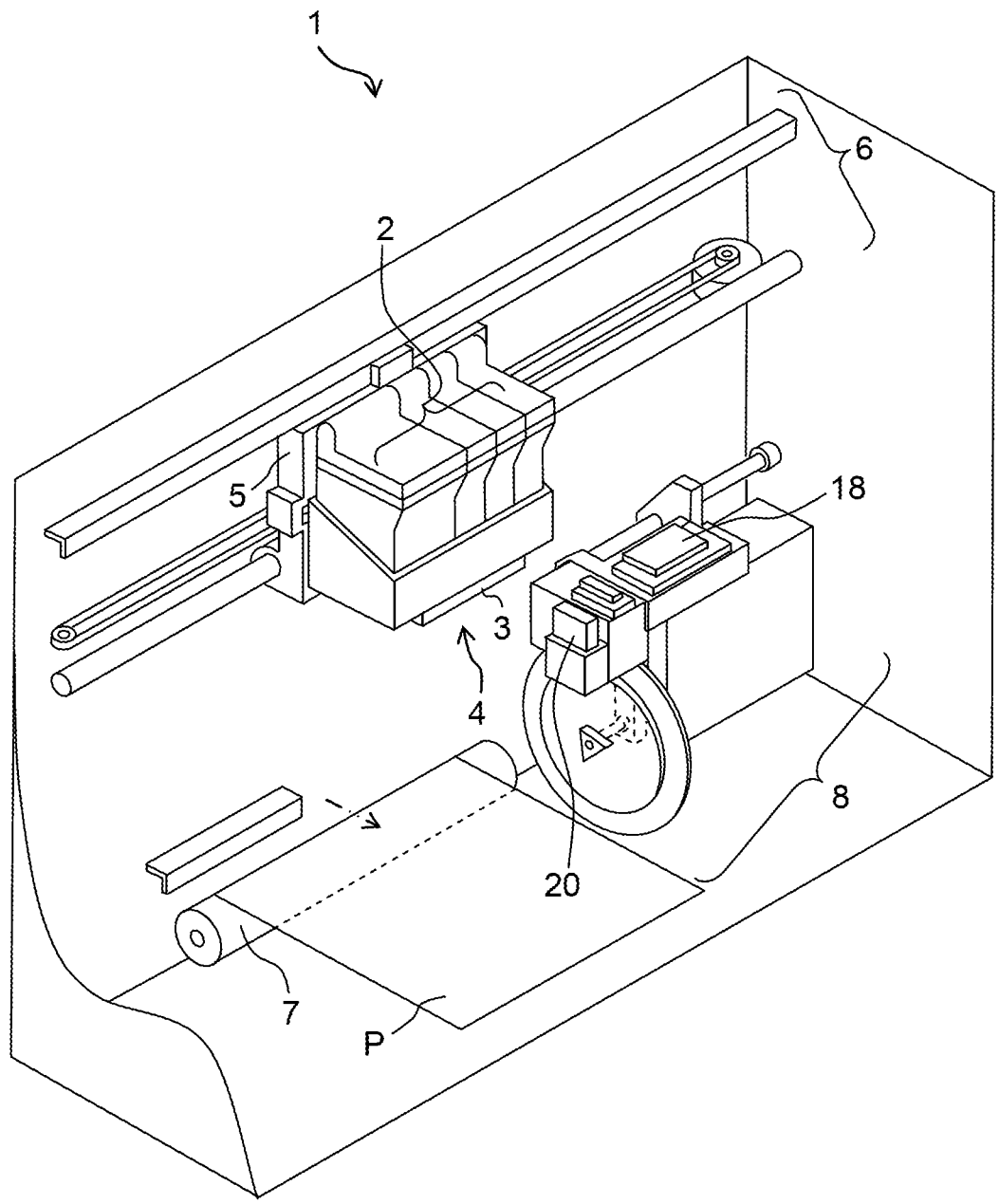
FIG. 2 is a schematic perspective view depicting the configuration of an example of an ink jet recording apparatus related to the present teaching.

FIG. 2 depicts an example of the configuration of the ink-jet recording apparatus related to the present teaching. As depicted in FIG. 2, an ink-jet recording apparatus 1 includes, as main constitutive components, four ink cartridges 2, an ink jetting (discharging) mechanism (ink-jet head) 3, a head unit 4, a carriage 5, a driving unit 6, a platen roller 7, and a purge device 8.

Each of the four ink cartridges 2 contains one color ink of four color water-based inks which are water-based yellow, magenta, cyan, and black inks. For example, the water-based magenta ink is the water-based ink for ink-jet recording related to the present teaching. Further, for example, the water-based cyan ink is the water-based cyan ink for ink-jet recording constructing the ink set related to the present teaching. In this exemplary embodiment, a set of the four ink cartridges 2 are depicted. However, in place of this four-ink cartridge set, it is also allowable to use an integrated type ink cartridge in which the interior thereof is comparted so that a water-based yellow ink accommodating section, a water-based magenta ink accommodating section, a water-based cyan ink accommodating section, and a water-based black ink accommodating section are formed. As a main body of the ink cartridge, for example, any conventionally known main body of an ink cartridge may be used.

The ink-jet head 3 disposed on the head unit 4 performs recording on a recording medium P (for example, recording paper P or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application Laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink jet recording apparatus 1, rather than being provided on the carriage 5. In such aspects, for example, the four ink cartridges 2 are connected to the head unit 4 provided on the carriage 5 with tubes, etc., and the inks are supplied from the four ink cartridges 2 via the tubes, respectively, to the head unit 4. Further, in these aspects, it is allowable to use four ink bottles having a bottle shape, instead of using the four ink cartridges 2. In such a case, each of the ink bottles is preferably provided with an inlet port via which the ink is poured from the outside to the inside of each of the ink bottles.

Ink-jet recoding, with the use of the ink-jet recording apparatus 1, is performed, for example, as follows. At first, the recording paper P is supplied from a paper feed cassette (not depicted in the drawings) provided at a side portion or a lower portion of the ink-jet recording apparatus 1. The recording paper P is introduced into a space between the ink-jet head 3 and the platen roller 7. A predetermined recording is performed on the introduced recording paper P with the water-based ink(s) jetted or discharged from the ink-jet head 3. The recording paper P after having the recording performed thereon is discharged from the ink-jet recording apparatus 1. According to the present teaching, it is possible to obtain a printed matter in which both the chromaticness of magenta, and the chromaticness of the secondary color are satisfactory. A paper feeding mechanism and a paper discharging mechanism for the recording paper P are omitted from the illustration in FIG. 2.

The apparatus depicted in FIG. 2 adopts the serial type ink-jet head. However, the present teaching is not limited to or restricted by this. The ink-jet recording apparatus may be an apparatus which adopts a line type ink-jet head.

EXAMPLES

Next, Examples of the present teaching will be explained together with Comparative Examples. Note that the present teaching is not limited to and restricted by Examples and Comparative Examples described below.

Preparation of Aqueous Pigment Dispersions A to G

Pure water (purified water) was added to 20% by mass of a pigment (PR122) and 7% by mass of sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter (pore size 3.0 μm). Thus, aqueous pigment dispersion (water pigment dispersion) A indicated in TABLE 1 was obtained. Note that the styrene-acrylic acid copolymer is a water-soluble polymer which is generally used as a dispersant for pigment (pigment dispersant). Further, aqueous pigment dispersions B to G indicated in TABLE 1 to TABLE 4 were obtained in a similar manner regarding the aqueous pigment dispersion A, except for appropriately changing the kind of pigment, the component ratio and the duration time of dispersing process.

Reference Examples 1 to 3

Components, which were included in Ink Composition (TABLE 1) and which were different from the aqueous pigment dispersions A to C, were mixed uniformly or homogeneously; and thus an ink solvent was obtained. Subsequently, the obtained ink solvent was added to each of the aqueous pigment dispersions A to C, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Reference Examples 1 to 3 indicated in TABLE 1 was obtained.

An ink-jet recording apparatus MFC-J6995CDW produced by BROTHER INDUSTRIES., LTD., was used so as to form each of image sets by using each of the water-based inks of Reference Examples 1 to 3. Each of the image sets had a plurality of solid images recorded on recording paper ("Hammermill Fore (trade name) Multi-Purpose Paper" produced by INTERNATIONAL PAPER COMPANY), while changing the recording duty at every 5% in a range of 0% to 100%. In each of the image sets of Reference Examples 1 to 3, a solid image (image $L^*_{60}$) of which the lightness $L^*$ was closest to 60 among the plurality of solid images was selected, and chromaticness ($C^*$) of the image $L^*_{60}$ was measured by using a spectrophotometric colorimetry meter "SpectroEye" produced by X-RITE INC. Note that the lightness $L^*$ was also measured by using the spectrophotometric colorimetry meter "SpectroEye".

The ink composition and the results of measurement in Reference Examples 1 to 3 are indicated in TABLE 1.

TABLE 1 (Following)—LEGEND

*1: Aqueous dispersion of PR122 (quinacridone pigment; mean particle diameter: 125 nm); numeral in the table indicates pigment solid content amount.

*2: Aqueous dispersion of PR202 (quinacridone pigment; mean particle diameter: 125 nm); numeral in the table indicates pigment solid content amount.

*3: Aqueous dispersion of PV19 (quinacridone pigment; mean particle diameter: 124 nm); numeral in the table indicates pigment solid content amount.

*4: Nonionic surfactant (acetylene glycol-based surfactant); produced by AIR PRODUCTS AND CHEMICALS, INC.; numeral in the table indicates the effective ingredient amount.

*5: Anionic surfactant, manufactured by LION SPECIALTY CHEMICALS CO., LTD.; effective ingredient amount: 28% by mass; numeral in the table indicates effective ingredient amount.

TABLE 1

| | | | REFERENCE EXAMPLES | | |
| --- | --- | --- | --- | --- | --- |
| | | | 1 | 2 | 3 |
| Ink Composition (% by mass) | Non-solid solution pigment | Aqueous pigment dispersion A (*1) | 7.0 | — | — |
| | | Aqueous pigment dispersion B (*2) | — | 7.0 | — |
| | | Aqueous pigment dispersion C (*3) | — | — | 7.0 |
| | Humectant | Glycerol | 7.0 | 7.0 | 7.0 |
| | | Triethylene glycol | 5.0 | 5.0 | 5.0 |

TABLE 1-continued

|  |  | REFERENCE EXAMPLES | | |
|---|---|---|---|---|
|  |  | 1 | 2 | 3 |
| Penetrant | Triethylene glycol-n-butyl ether | 2 | 2 | 2 |
| Surfactant | SURFYNOL (trade name) 440 (*4) | 0.4 | 0.4 | 0.4 |
|  | SUNNOL (trade name) NL 1430 (*5) | 0.4 | 0.4 | 0.4 |
| Water |  | balance | balance | balance |
| Chromaticness C* at a portion in which Lightness L* was closest to 60 (Chromaticness C* of Image $L_{60}$*) |  | 55 | 59 | 65 |

As indicated in TABLE 1, the chromaticness C* of the Image $L^*_{60}$ in reference example 3 (the water-based ink containing PV19) was higher than the chromaticness C* of the Images $L^*_{60}$ in reference examples 1 and 2 (the water-based inks containing PR122 and PR202, respectively). Note that although in Reference Examples 1 to 3, the chromaticness C* of each of the solid images recorded by using the water-based inks containing PR122, PR202 and PV19, respectively, were measured, the magnitude relationship regarding the chromaticness C* among Reference Examples 1 to 3 was not changed even in a case that each of aqueous dispersions containing 7% by mass of PR122, PR202 and PV19 was used, instead of using each of the water-based inks containing PR122, PR202 and PV19.

Examples 1 to 13 and Comparative Examples 1 to 4

Components, which were included in Ink Composition (TABLE 3 or TABLE 4) and which were different from the aqueous pigment dispersions, were mixed uniformly or homogeneously; and thus an ink solvent was obtained. Subsequently, the obtained ink solvent was added to each of the aqueous pigment dispersions, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Examples 1 to 13 indicated in TABLE 3 and Comparative Examples 1 to 4 indicated in TABLE 4 was obtained.

With respect to the water-based inks of Examples 1 to 13 and Comparative Examples 1 to 4, respectively, (a) Evaluation of Chromaticness in each lightness (brightness), and (b) Evaluation of Secondary color were performed by the following methods.

(a) Evaluation of Chromaticness in Each Lightness (Brightness)

A plurality of solid images were recorded to have mutually different recording duties by using each of the water-based inks of Examples 1 to 13 and Comparative Examples 1 to 4, in a similar manner as in Reference Examples 1 to 3. The chromaticness (C*) of a solid image (Image $L^*_{60}$), among the plurality of solid images, of which lightness L* was closest to 60 and the chromaticness (C*) of a solid image (Image $L^*_{55}$), among the plurality of solid images, of which lightness L* was closest to 55 were each measured by using the spectrophotometric colorimetry meter "Spectro-Eye"; and the chromaticness in each lightness was evaluated based on the following evaluation criterion. Note that the lightnesses L* were also measured by using the spectrophotometric colorimetry meter "SpectroEye".

Criterion for Evaluation of Chromaticness in Each Lightness (Brightness)

A: The total (sum) of the chromaticness C* of Image $L^*_{60}$ and the chromaticness (C*) of Image $L^*_{55}$ was not less than 127.

B: The total (sum) was in a range of not less than 121 to less than 127.

C: The total (sum) was less than 121.

(b) Evaluation of Chromaticness of Secondary Color

An ink set was constructed by combining the water-based ink of each of Examples 1 to 13 and Comparative Examples 1 to 4 with a water-based cyan ink 1 or 2 indicated in TABLE 2. The ink: jet recording apparatus MFC-J6995CDW was used so as to record a plurality of images by using the ink set of each of Examples 1 to 13 and Comparative Examples 1 to 4 on the recording medium "Hammermill Fore (trade name) Multi-Purpose Paper", at the recording duty of 120%, while changing a ratio (MD:CD) of the number of dots of the water-based magenta ink (MD) and the number of dots of the water-based cyan ink (CD), at every 5% in a range of MD:CD=100:0 to 0:100. Among the plurality of images, one (an image) of the plurality of images of which hue angle was closest to 270 degrees was made to be an evaluation sample. The values of chromaticness (C*) at 5 (five) locations in the evaluation sample were measured by using the spectrophotometric colorimetry meter "SpectroEye", the average value of the values of chromaticness (C*) at the five locations was obtained, and the chromaticness of secondary color was evaluated based on the following evaluation criterion. Note that in this evaluation, the water-based cyan ink 1 was used in each of Examples 1 to 12 and Comparative Examples 1 to 4, and the water-based cyan ink 2 was used in Example 13. Further, note that in the present teaching, the term "hue angle" represents, for example, an angle in the L*a*b* color system chromaticity diagram indicating a* and b* on a plane, and is defined as follows:

In $a^* \geq 0$, $b^* \geq 0$ (first quadrant), the hue angle=$\tan^{-1}(b^*/a^*)$;

In $a^* \leq 0$, $b^* \geq 0$ (second quadrant), the hue angle=180 degrees+$\tan^{-1}(b^*/a^*)$;

In $a^* \leq 0$, $b^* \leq 0$ (third quadrant), the hue angle=180 degrees+$\tan^{-1}(b^*/a^*)$; and In $a^* \geq 0$, $b^* \leq 0$ (fourth quadrant), the hue angle=360 degrees+$\tan^{-1}(b^*/a^*)$.

TABLE 2 (Following)—LEGEND

*6: Aqueous dispersion of C.I. Pigment Blue 15:3 (cyan pigment; mean particle diameter: 95 nm); numeral in the table indicates pigment solid content amount.

*4: Nonionic surfactant (acetylene glycol-based surfactant); produced by AIR PRODUCTS AND CHEMICALS, Inc.; numeral in the table indicates the effective ingredient amount.

*5: Anionic surfactant, manufactured by LION SPECIALTY CHEMICALS CO., LTD.; effective ingredient amount: 28% by mass; numeral in the table indicates effective ingredient amount.

The unit in the ink composition in TABLE 2: % by mass

TABLE 2

| | | Water-based Cyan Ink | 1 | 2 |
|---|---|---|---|---|
| Composition (% by mass) | Pigment (C) | Aqueous pigment dispersion D (*6) | 4.5 | 8 |
| | Humectant | GlyceroL | 10 | 10 |
| | | Triethylene glycol | 5 | 5 |
| | Penetrant | Triethylene glycol-n-butyl ether | 7 | 2 |
| | Surfactant | SURFYNOL (trade name) 440 (*2) | 0.4 | 0.4 |
| | | SUNNOL (trade name) NL 1430 (*5) | 0.4 | 0.4 |
| | Water | | balance | balance |

Criterion for Evaluation of Secondary Color

A: The chromaticness (C*) was not less than 47.
B: The chromaticness (C*) was in a range of not less than 45 to less than 47.
C: The chromaticness (C*) was less than 45.

The water-based ink composition and the results of evaluations of each of the water-based inks of Examples 1 to 13 and Comparative Examples 1 to 4 are indicated in TABLE 3 and TABLE 4.

TABLE 3 (Following)—LEGEND

*7: Aqueous dispersion of solid solution of PR122 and PV19 (quinacridone pigment; mean particle diameter: 128 nm); numeral in the table indicates pigment solid content amount.

*8: Aqueous dispersion of solid solution of PR202 and PV19 (quinacridone pigment; mean particle diameter: 128 nm); numeral in the table indicates pigment solid content amount.

*3: Aqueous dispersion of PV19 (quinacridone pigment; mean particle diameter: 124 nm); numeral in the table indicates pigment solid content amount.

*4: Nonionic surfactant (acetylene glycol-based surfactant); produced by AIR PRODUCTS AND CHEMICALS, Inc.; numeral in the table indicates the effective ingredient amount.

*5: Anionic surfactant, manufactured by LION SPECIALTY CHEMICALS CO., LTD.; effective ingredient amount: 28% by mass; numeral in the table indicates effective ingredient amount.

The unit in the ink composition in TABLE 3: % by mass

TABLE 3

| | | | EXAMPLES | | | | | | | |
|---|---|---|---|---|---|---|---|---|---|---|
| | | | 1 | 2 | 3 | 4 | 5 | 6 | 7 | 8 |
| Ink composition (% by mass) | Solid solution pigment (S) | Aqueous pigment dispersion E (*7) | 4.9 | 4.2 | 3.5 | 4.55 | 4.25 | 2.8 | 5.6 | 2.1 |
| | | Aqueous pigment dispersion F (*8) | — | — | — | — | — | — | — | — |
| | Non-solid solution pigment (P) | Aqueous pigment dispersion C (*3) | 2.1 | 2.8 | 3.5 | 1.95 | 4.25 | 4.2 | 1.4 | 4.9 |
| | Humectant | Glycerol | 7.0 | 7.0 | 7.0 | 8.0 | 6.5 | 7.0 | 7.0 | 7.0 |
| | | Triethylene glycol | 5.0 | 5.0 | 5.0 | 5.0 | 5.0 | 5.0 | 5.0 | 5.0 |
| | Penetrant | Triethylene glycol-n-butyl ether | 2 | 2 | 2 | 2 | 2 | 2 | 2 | 2 |
| | Surfactant | SURFYNOL (trade name) 440 (*4) | 0.4 | 0.4 | 0.4 | 0.4 | 0.4 | 0.4 | 0.4 | 0.4 |
| | | SUNNOL (trade name) NL1430 (*5) | 0.4 | 0.4 | 0.4 | 0.4 | 0.4 | 0.4 | 0.4 | 0.4 |
| | Water | | balance | balance | balance | balance | balance | balance | balance | balance |
| S:P | | | 7:3 | 6:4 | 5:5 | 7:3 | 5:5 | 4:6 | 8:2 | 3:7 |
| S + P | | | 7.0 | 7.0 | 7.0 | 6.5 | 8.5 | 7.0 | 7.0 | 7.0 |
| Water-based cyan ink used in (b) Evaluation of Chromaticness of Secondary Color | | | 1 | 1 | 1 | 1 | 1 | 1 | 1 | 1 |
| (a) Chromaticness in each Lightness | | | A | A | A | A | A | A | B | A |
| (b) Chromaticness of Secondary Color | | | A | A | A | A | A | B | A | B |

| | | | EXAMPLES | | | | |
|---|---|---|---|---|---|---|---|
| | | | 9 | 10 | 11 | 12 | 13 |
| Ink composition (% by mass) | Solid solution pigment (S) | Aqueous pigment dispersion E (*7) | 4.2 | 4.5 | — | 4.2 | 4.2 |
| | | Aqueous pigment dispersion F (*8) | — | — | 4.9 | — | — |
| | Non-solid solution pigment (P) | Aqueous pigment dispersion C (*3) | 1.8 | 4.5 | 2.1 | 2.8 | 2.8 |

TABLE 3-continued

|  |  |  |  |  |  |  |  |
|---|---|---|---|---|---|---|---|
|  | Humectant | Glycerol | 8.0 | 6.5 | 7.0 | 7.0 | 7.0 |
|  |  | Triethylene glycol | 5.0 | 5.0 | 5.0 | 5.0 | 5.0 |
|  | Penetrant | Triethylene glycol-n-butyl ether | 2 | 2 | 2 | 2 | 2 |
|  | Surfactant | SURFYNOL (trade name) 440 (*4) | 0.4 | 0.4 | 0.4 | 0.2 | 0.4 |
|  |  | SUNNOL (trade name) NL1430 (*5) | 0.4 | 0.4 | 0.4 | 0.4 | 0.4 |
|  | Water |  | balance | balance | balance | balance | balance |
| S:P |  |  | 7:3 | 5:5 | 7:3 | 6:4 | 6:4 |
| S + P |  |  | 6.0 | 9.0 | 7.0 | 7.0 | 7.0 |
| Water-based cyan ink used in (b) Evaluation of Chromaticness of Secondary Color |  |  | 1 | 1 | 1 | 1 | 2 |
| (a) Chromaticness in each Lightness |  |  | B | B | A | B | A |
| (b) Chromaticness of Secondary Color |  |  | B | B | A | B | B |

TABLE 4 (Following)—LEGEND

*7: Aqueous dispersion of solid solution of PR122 and PV19 (quinacridone pigment; mean particle diameter: 128 nm); numeral in the table indicates pigment solid content amount.

*1: Aqueous dispersion of PR122 (quinacridone pigment; mean particle diameter: 125 nm); numeral in the table indicates pigment solid content amount.

*3: Aqueous dispersion of PV19 (quinacridone pigment; mean particle diameter: 124 nm); numeral in the table indicates pigment solid content amount.

*9: Aqueous dispersion of C.I. Pigment Red 9 (azo pigment; mean particle diameter: 126 nm); numeral in the table indicates pigment solid content amount.

*4: Nonionic surfactant (acetylene glycol-based surfactant); produced by AIR PRODUCTS AND CHEMICALS, Inc.; numeral in the table indicates the effective ingredient amount.

*5: Anionic surfactant, manufactured by LION SPECIALTY CHEMICALS CO., LTD.; effective ingredient amount: 28% by mass; numeral in the table indicates effective ingredient amount.

The unit in the ink composition in TABLE 4: % by mass

As indicated in TABLE 3, in Examples 1 to 13, the evaluation results were satisfactory in relation to both of (a) Evaluation of Chromaticness in Each Lightness and (b) Evaluation of Chromaticness of Secondary Color.

Regarding Examples 1 to 3 and 6 to 8 which had similar conditions except for changing S:P therein, Examples 1 to 3 in which S:P was made to be S:P=7:3 to 5:5 were further excellent in the balance of the chromaticness in each lightness and the chromaticness of secondary color, as compared with Examples 6 to 8 in each of which S:P was made to be S:P=4:6, 8:2 or 3:7.

Regarding Examples 4 and 9 which had similar conditions except for changing S+P therein, Example 4 in which S+P was made to be S+P=6.5% by mass was further excellent results in (a) the evaluation of Chromaticness in Each Lightness and in (b) the evaluation of Chromaticness of Secondary Color, as compared with Example 9 in which S+P was made to be S+P=6.0% by mass. Further, regarding Examples 5 and 10 which had similar conditions except for changing S+P therein, Example 5 in which S+P was made to be S:P=8.5% by mass was further excellent results in (a) the evaluation of Chromaticness in Each Lightness and in (b) the evaluation of Chromaticness of Secondary Color, as compared with Example 10 in which S+P was made to be S+P=9.0% by mass.

TABLE 4

|  |  |  | COMPARATIVE EXAMPLES ||||
|---|---|---|---|---|---|---|
|  |  |  | 1 | 2 | 3 | 4 |
| Ink composition (% by mass) | Solid solution pigment (S) | Aqueous pigment dispersion E (*7) | 7.0 | 4.2 | — | 4.2 |
|  | Non-solid solution pigment (P) | Aqueous pigment dispersion A (*1) | — | 2.8 | 3.5 | — |
|  |  | Aqueous pigment dispersion C (*3) | — | — | 3.5 | — |
|  |  | Aqueous pigment dispersion G (*9) | — | — | — | 2.8 |
|  | Humectant | Glycerol | 7.0 | 7.0 | 7.0 | 7.0 |
|  |  | Triethylene glycol | 5.0 | 5.0 | 5.0 | 5.0 |
|  | Penetrant | Triethylene glycol-n-butyl ether | 2 | 2 | 2 | 2 |
|  | Surfactant | SURFYNOL (trade name) 440 (*4) | 0.4 | 0.4 | 0.4 | 0.4 |
|  |  | SUNNOL (trade name) NL1430 (*5) | 0.4 | 0.4 | 0.4 | 0.4 |
|  | Water |  | balance | balance | balance | balance |
| S:P |  |  | 10:0 | 6:4 | 0:10 | 6:4 |
| S + P |  |  | 7.0 | 7.0 | 7.0 | 7.0 |
| Water-based cyan ink used in (b) Evaluation of Chromaticness of Secondary Color |  |  | 1 | 1 | 1 | 1 |
| (a) Chromaticness in each Lightness |  |  | C | C | C | C |
| (b) Chromaticness of Secondary Color |  |  | A | A | A | C |

Example 2, in which the content ratio of the acetylene glycol-based surfactant was made to be not less than 5 parts by mass (5.7 parts by mass) to the total, of the content amount of the solid solution pigment and the content amount of the non-solid solution pigment, which was 100 parts by mass had further excellent results in (a) the evaluation of Chromaticness in Each Lightness and in (b) the evaluation of Chromaticness of Secondary Color, as compared with Example 12 in which the content ratio of the acetylene glycol-based surfactant was made to be less than 5 parts by mass (2.9 parts by mass) to the total, of the content amount of the solid solution pigment and the content amount of the non-solid solution pigment, which was 100 parts by mass.

In (b) the evaluation of Chromaticness of Secondary Color, regarding Examples 2 and 13 which had similar conditions except for changing the content amount (C) of the cyan pigment in the entire amount of the water-based cyan ink, Example 2 in which C<S+P was satisfied was further excellent result in (b) the evaluation of Chromaticness of Secondary Color, as compared with Example 13 in which C>S+P was satisfied.

On the other hand, as indicated in TABLE 4, Comparative Example 1 which did not use the non-solid solution pigment had a unsatisfactory result in (a) the evaluation of Chromaticness in Each Lightness. Further, Comparative Example 2 which used PR122 as the non-solid solution pigment, rather than using PV19 also had unsatisfactory results in (a) the evaluation of Chromaticness in Each Lightness. In Comparative Example 2, although PR122 was included in the solid solution pigment, PR122 was not used to record Image $L^*_{60}$ of which chromaticness C* is highest among the plurality of pigments constructing the solid solution pigment. Furthermore, Comparative Example 3 which did not use the solid solution pigment, but used the two kinds of non-solid solution pigments also had unsatisfactory results in (a) the evaluation of Chromaticness in Each Lightness. Moreover, Comparative Example 4 which used C.I. Pigment Red 9 which was an azo pigment, as the non-solid solution pigment, had unsatisfactory results in (a) the evaluation of Chromaticness in Each Lightness and in (b) the evaluation of Chromaticness of Secondary Color. In Comparative Example 4, C.I. Pigment Red 9 used as the non-solid solution pigment was a pigment of such a kind that was not included in the solid solution pigment.

As described above, the water-based ink related to the present teaching has high chromaticness of magenta and high chromaticness of secondary color. The water-based ink related to the present teaching is widely applicable, for example, to a variety of kinds of the ink-jet recording, as a water-based magenta ink for ink-jet recording.

What is claimed is:

1. An ink set comprising:
   a water-based magenta ink for ink-jet recording; and a water-based cyan ink for ink-jet recording which includes a cyan pigment and water, wherein the water-based magenta ink includes:
   water;
   a solid solution pigment including C.I. Pigment Red 122 and C.I. Pigment Violet 19; and
   a non-solid solution pigment including C.I. Pigment Violet 19;
   wherein, in the water-based magenta ink, a total (S+P) of a content amount (S) of the solid solution pigment and a content amount (P) of the non-solid solution pigment in an entire amount of the water-based ink is not less than 6.5% by mass and not more than 8.5% by mass, the mass ratio (S:P) of the content amount (S) of the solid solution pigment to the content amount (P) of the non-solid solution pigment in the entire amount of the water-based ink is in a range of 7:3 to 5:5, and,
   a ratio of a content of the solid solution pigment to an entire amount of the water-based ink is not less than 3% by mass and not more than 6% by mass, wherein the ink set further satisfies the following conditional expression:

$C<S+P$ wherein C is a content amount (% by mass) of the cyan pigment in an entire amount of the water-based cyan ink; and
   S+P is a total (% by mass) of a content amount (S) of the solid solution pigment and a content amount (P) of the non-solid solution pigment in an entire amount of the water-based magenta ink,
   the water-based magenta ink further comprising an acetylene glycol-based surfactant, wherein a ratio of a content of the acetylene glycol-based surfactant to a total of 100 parts by mass of a content of the solid solution pigment and a content of the non-solid solution pigment is not less than 5 parts by mass.

2. The ink set according to claim 1, wherein a mean particle diameter of the solid solution pigment is greater than a mean particle diameter of the non-solid solution pigment.

3. The ink set according to claim 1, wherein the cyan pigment is C.I. Pigment Blue 15:3.

* * * * *